(12) United States Patent
Itoh

(10) Patent No.: US 6,349,926 B1
(45) Date of Patent: Feb. 26, 2002

(54) LIQUID-SEALED VIBRATION INSULATOR AND METHOD FOR PRODUCING SAME

(75) Inventor: Masaaki Itoh, Chiba (JP)

(73) Assignee: Kinugawa Rubber Ind. Co., Ltd., Chiba (JP)

( * ) Notice: Subject to any disclaimer, the term of this patent is extended or adjusted under 35 U.S.C. 154(b) by 0 days.

(21) Appl. No.: 09/461,213

(22) Filed: Dec. 15, 1999

(30) Foreign Application Priority Data

Dec. 16, 1998 (JP) .......................................... 10-357071

(51) Int. Cl.$^7$ ................................................ F16F 13/00
(52) U.S. Cl. .................................. 267/140.12; 248/552
(58) Field of Search ........................ 267/140.12, 141.2, 267/141.3, 141.4, 141.5, 35, 220, 219, 293; 248/552, 568

(56) References Cited

U.S. PATENT DOCUMENTS

| | | | | |
|---|---|---|---|---|
| 4,687,188 A | * | 8/1987 | Knurek et al. | ............ 267/140.1 |
| 4,693,456 A | * | 9/1987 | Kanda | ..................... 267/140.1 |
| 4,702,346 A | * | 10/1987 | Uno et al. | ................... 181/207 |
| 4,728,086 A | * | 3/1988 | Ishiyama et al. | ........ 267/140.1 |
| 5,102,106 A | * | 4/1992 | Thelamon et al. | ........ 267/140.1 |
| 5,145,155 A | * | 9/1992 | Funahashi et al. | ..... 267/140.12 |
| 5,259,294 A | * | 11/1993 | May | ......................... 92/181 P |
| 6,102,380 A | * | 8/2000 | Tsutsumida | ............ 267/140.12 |

FOREIGN PATENT DOCUMENTS

| | | |
|---|---|---|
| JP | 2-36817 | 8/1990 |
| JP | 6-50135 | 6/1994 |
| JP | 7-42782 | 2/1995 |

\* cited by examiner

*Primary Examiner*—Matthew C. Graham
*Assistant Examiner*—Xuan Lan Nguyen
(74) *Attorney, Agent, or Firm*—Foley & Lardner

(57) ABSTRACT

A liquid-sealed vibration insulator is comprised of a cylindrical elastic member integrally formed with an inner cylinder, first and second rings and an orifice ring located between the first and second rings. An outer cylinder is integrally connected to the elastic member through the first and second rings. A first liquid chamber is formed at a portion between the outer cylinder and the elastic member and between the first ring and the orifice ring, and a second liquid chamber is formed at a portion between the outer cylinder and the elastic member and between the orifice ring and the second ring. The first and second liquid chambers are fluidly communicated through an orifice passage defined by the orifice ring.

15 Claims, 13 Drawing Sheets

LIQUID-SEALED VIBRATION INSULATOR AND METHOD FOR PRODUCING SAME

BACKGROUND OF THE INVENTION

The present invention relates to a fluid-sealed vibration insulator which is applicable to a suspension and an engine mount for automotive vehicles, and relates to a method for producing such a fluid-sealed vibration insulator.

Various liquid-sealed vibration insulators have been proposed and in practical use. A Japanese Patent Provisional Publication No. 6-50135 discloses a typical liquid-sealed vibration insulator which has a pair of liquid chambers connected with each other through an orifice passage. This conventional vibration insulator is arranged to generate a damping force by flowing liquid between the liquid chambers through the orifice passage according to a volumetric change of the liquid chamber caused by vibration input thereto.

SUMMARY OF THE INVENTION

However, such a conventional liquid-sealed vibration insulator is constituted by several elastic members and several rigid members. Accordingly, it is necessary to prepare several forming dies for elastic members. This generally increases steps for producing vibration insulators and the production cost thereof.

It is therefore an object of the present invention to provide an improved liquid-sealed vibration insulator and a method for producing the same. This liquid-sealed vibration insulator has a simple structure which largely improves production steps as compared with the conventional one while one while satisfying a vibration damping performance.

An aspect of the present invention resides in a liquid-sealed vibration insulator which comprises an inner cylinder, a first ring having a L-shaped cross section, a second ring, an orifice ring, an elastic member and an outer cylinder. The orifice ring has a U-shaped cross section. The orifice ring is located between the first and second rings. The elastic member of a cylindrical shape has a cylinder inner surface to which the inner cylinder is integrally connected, and a cylinder outer surface to which the first ring, the orifice ring and the second ring are integrally connected. The elastic member has a first groove formed on the cylinder outer surface between the first ring and the orifice ring and a second groove formed on the cylinder outer surface between the orifice ring and the second ring. The outer cylinder is integrally connected to the first ring and the second ring. The outer cylinder and the first groove define a first liquid chamber. The outer cylinder and the second ring define a second liquid chamber. The outer cylinder and said orifice ring define an orifice passage fluidly communicating the first and second liquid chamber. The first and second liquid chambers and the orifice passage are filled with liquid.

Another aspect of the present invention resides in a method for producing a liquid-sealed vibration insulator. The method comprises a step for molding an elastic member of a cylindrical shape, a step for forming a plurality of projections on an inner surface of an outer cylinder and a step for assembling the elastic member and the outer cylinder in liquid. The molded elastic member has a cylinder inner surface integrally connected to an inner cylinder and a cylinder outer surface integrally connected to a first ring, an orifice ring and a second ring. The elastic member has a first groove formed on the cylinder outer surface between the first ring and the orifice ring and a second groove formed on the cylinder outer surface between the orifice ring and the second ring.

DETAILED DESCRIPTION OF THE INVENTION

Referring to FIGS. 1 to 18, there is shown a liquid-sealed vibration insulator 2 of a first embodiment according to the present invention. This vibration insulator 2 is arranged to generate a damping force by flowing liquid of the liquid chambers through the orifice passage according to volumetric change of the liquid chamber caused by vibration input thereto.

Figure 1:
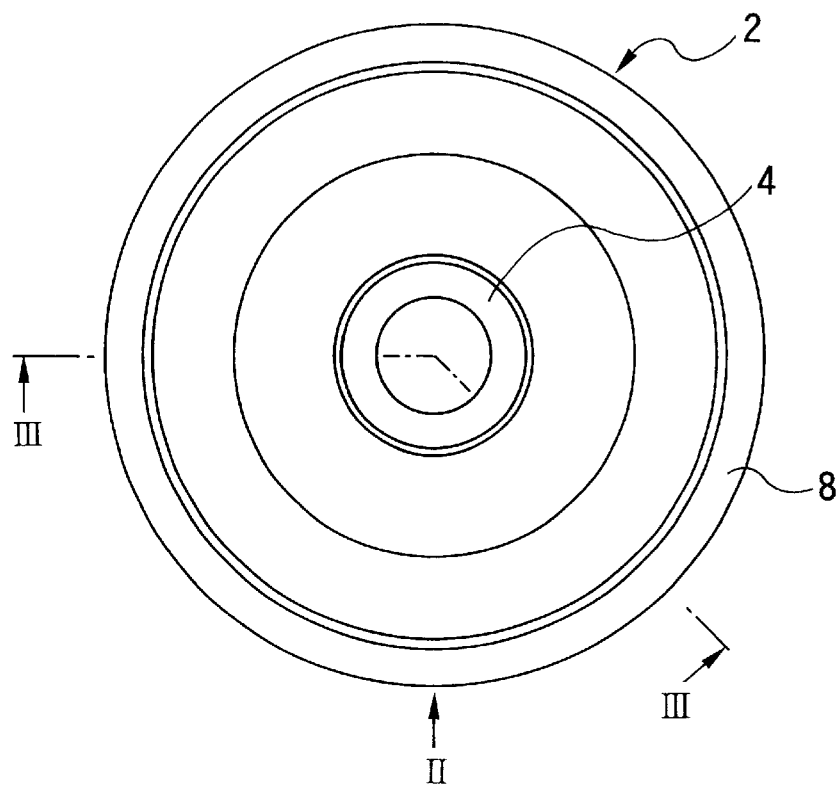
FIG. 1 is a top view showing a liquid-sealed vibration insulator of a first embodiment according to the present invention.
Figure 2:
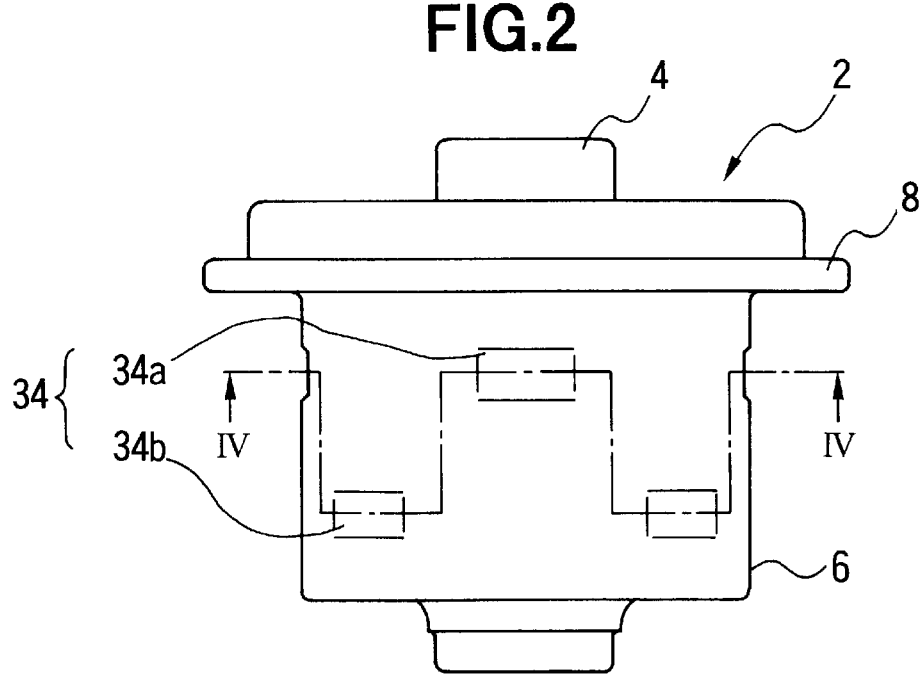
FIG. 2 is a side view taken in the direction of the arrow II of FIG. 1.
Figure 3:
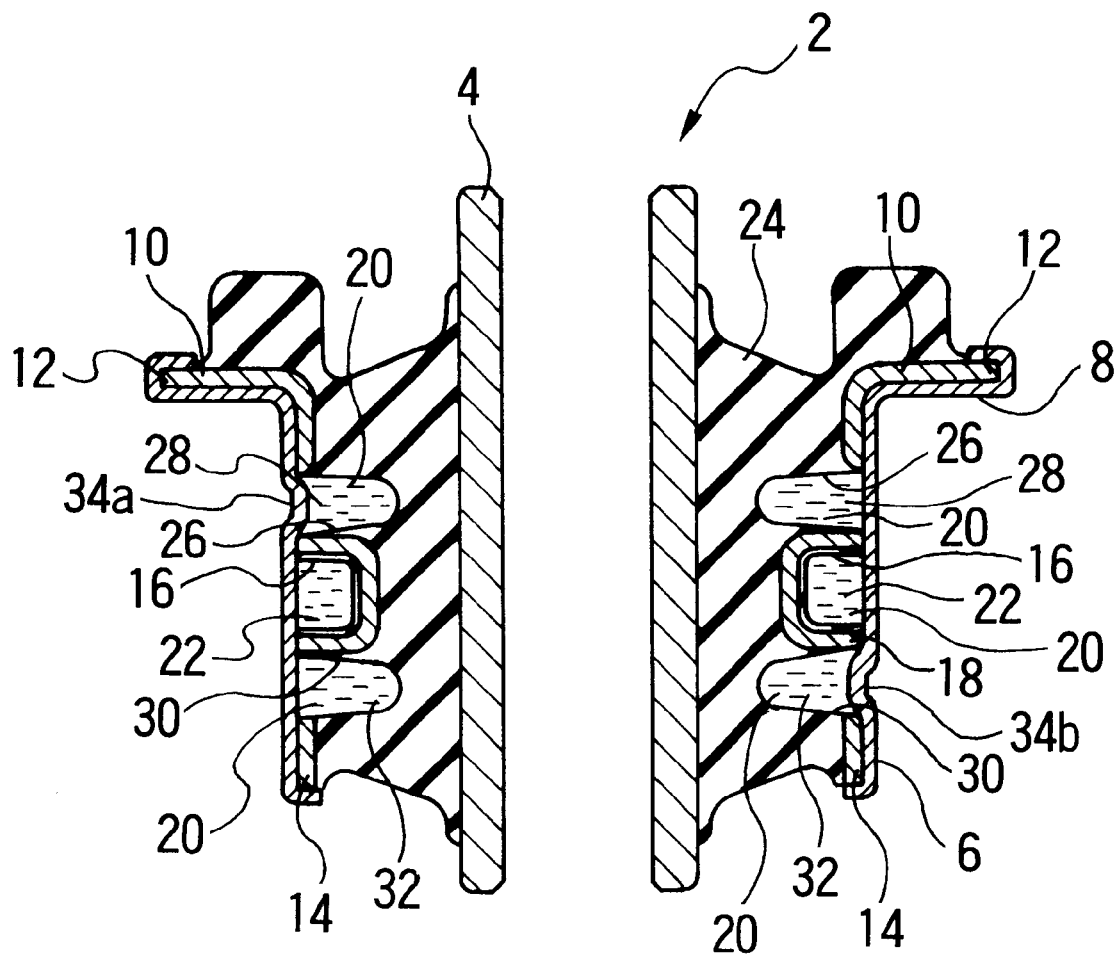
FIG. 3 is a cross-sectional view taken in the direction of the arrows substantially along the line III—III of FIG. 1.
Figure 4:
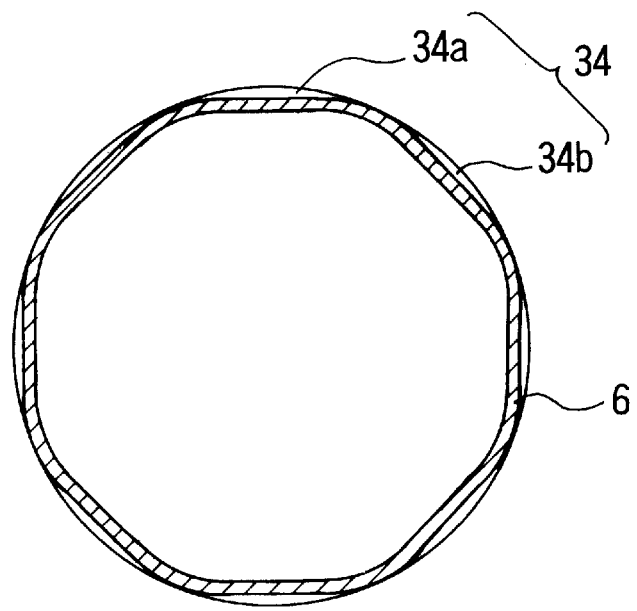
FIG. 4 is a cross-sectional view taken in the direction of the arrows substantially along the line IV—IV of FIG. 2.

As shown in FIGS. 1 to 4, the liquid-sealed vibration insulator 2 comprises an inner cylinder 4 made of metal and an outer cylinder 6 coaxially arranged with the inner cylinder 4. The outer cylinder 6 is also made of metal and has a flange portion 8 which extends from an upper end portion of the outer cylinder 6 to a diametrically outer side. The inner cylinder 4 and the outer cylinder 6 functions a vibration input portion and an insulator output portion or functions inversely. A flanged first ring 10 is fittingly installed to an inner surface of an upper portion of the outer cylinder 6. A flange end of the first ring 10 is engaged with an end of the flange portion 8 by means of caulking as shown in FIG. 3 so that the first ring 10 is fixedly connected to the outer cylinder 6. Further, a second ring 14 is fittingly installed to a lower end portion of the outer cylinder 6. A lower end of the second ring 14 is engaged with a lower end portion of the outer cylinder 6 by means of caulking as shown in FIG. 3 so as to be fixedly connected to the outer cylinder 6.

An orifice ring 18 made of metal is disposed between the first ring 10 and the second ring 14. The orifice ring 18 has a cross section of a channel shape and/or U-shape and is fixed to the inner surface of the outer cylinder 6. The channel shaped surface of the orifice ring 18 functions as a circumferential groove 16. An orifice passage 22 is defined by the circumferential groove 16 and the inner surface of the outer cylinder 6 and is filled liquid 20. The orifice passage 22 circumferentially extends along the inner surface of the outer cylinder 6 so as to form a ring-shaped passage. The orifice ring 18 is made from a metal sheet by blanking a pair of annular members which respectively have center holes from the metal sheet, drawing an inner periphery of each blanked annular ring into a L-shaped cross section, and welding the edges of the drawn end of the pair of members by means of butt welding.

The first ring 10, the second ring 14, the orifice ring 18 and an outer surface of the inner cylinder 4 are interconnected through an elastic member 24 of a cylindrical shape. More specifically, the elastic member 24 made of rubber is vulcanized so that an outer surface of the elastic member 24 is connected to the first ring 10, the second ring 14 and that an inner surface of the elastic member 24 is connected with the outer surface of the inner cylinder 4.

Figure 5:
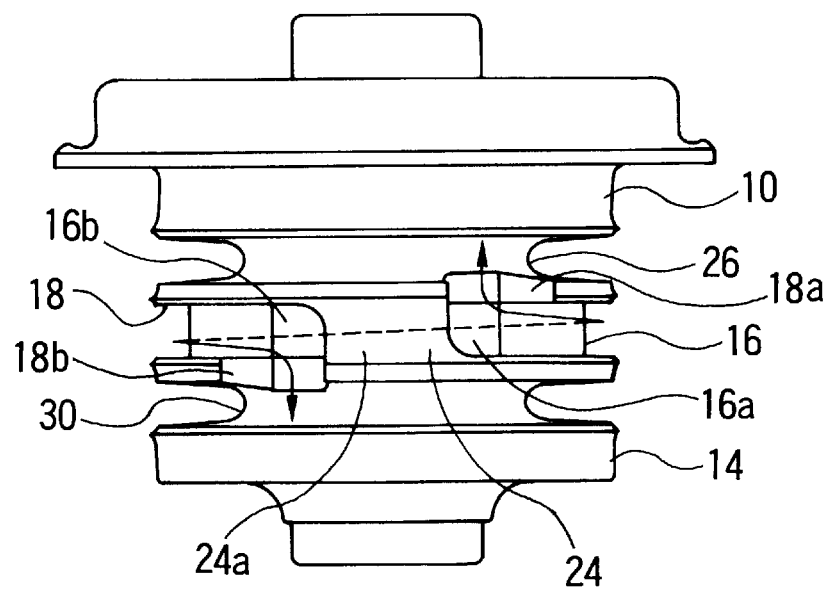
FIG. 5 is a side view showing an elastic member formed with an inner cylinder, first and second rings and an orifice ring.
Figure 6:
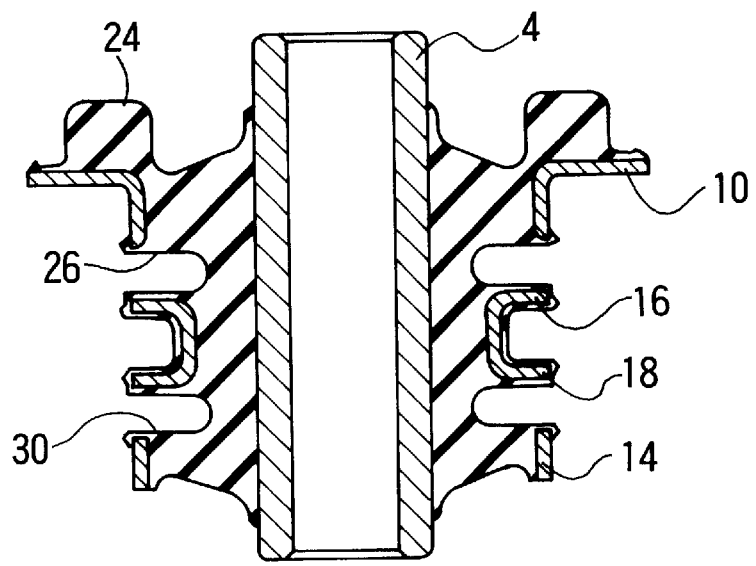
FIG. 6 is a cross-sectional view of FIG. 5.

A first groove 26 is formed on an outer surface of the elastic member 24 between the first ring 10 and the orifice ring 18 so as to form a ring shaped groove along the first ring 10 as shown in FIG. 5. A first liquid chamber 28 is defined by the first groove 26 and the inner surface of the outer cylinder 6 and is filled with the liquid 20.

A second groove 30 is formed on the outer surface of the elastic member 24 between the second ring 14 and the orifice ring 18 so as to form a ring shaped groove along the inner surface of the second ring 14 as shown in FIG. 5. A second liquid chamber 32 is defined by the second groove 30 and the inner surface of the outer cylinder 6 and is filled with the liquid 20.

The circumferential groove 16 of the orifice ring 18 is partially closed by a closing portion 24a of the elastic member 24 as shown in FIG. 5. The circumferential groove 16 has first and second end portions 16a and 16b defined by the closing portion 24a. The first end portion 16a is communicated with the first groove 26 through a first cutout portion 18a, and the second end portion 16b is communicated with the second groove 30 through a second cutout portion 18b. Therefore, the first fluid chamber 28 and the second fluid chamber 30 are communicated with each other through the orifice passage 22, and the liquid 20 flows between the first and second fluid chambers 28 and 30 along the circumferential direction of the outer cylinder 6 as shown by the arrows of FIG. 5.

A plurality of projections 34 of a rectangular shape are separately formed on the inner surface of the outer cylinder 6 at predetermined intervals. The projections 34 project inwardly from the outer cylinder 6 toward a center of the outer cylinder 6. The projections 34 include four upper projections 34a received by the first groove 26 at the predetermined intervals and four lower projections 34b received by the second groove 30 at the predetermined intervals. The upper projections 34a faced with the first groove 26 are in contact with the first ring 10 and the orifice ring 18 so as to keep the positional relationship between the elastic member 24 and the outer cylinder 6. Similarly, the lower projections 34b faced with the second groove portion 30 are in contact with the orifice ring 18 and the second ring 14. The upper projection 34a and the lower projections 34b are formed so as not to be overlapped with each other in the axial direction of the outer cylinder 6 and so as to be alternately arranged. The projections 34 are formed by recessing the outer surface of the outer cylinder 6 by means of forming dies.

Next, the method for producing the above-mentioned fluid-sealed vibration insulator 2 of the first embodiment according to the present invention will be discussed.

In a first process, the elastic member 24 is integrally formed with the inner cylinder 4, the first ring 10, the second ring 14 and the orifice ring 18. More specifically, the inner cylinder 4, the first ring 10, the second ring 14 and the orifice ring 18 are set in a rubber forming die so as to be located at predetermined positions, respectively. Then, material of the elastic member 24 is supplied into the molding die to integrally form the elastic member 24 with the inner cylinder 4, the first ring 10, the second ring 14 and the orifice ring 18. The first groove 26 and the second groove 30, which are communicated with the circumferential groove 16 of the orifice ring 18, are simultaneously formed by the molding of the rubber elastic member 24.

Figure 7:
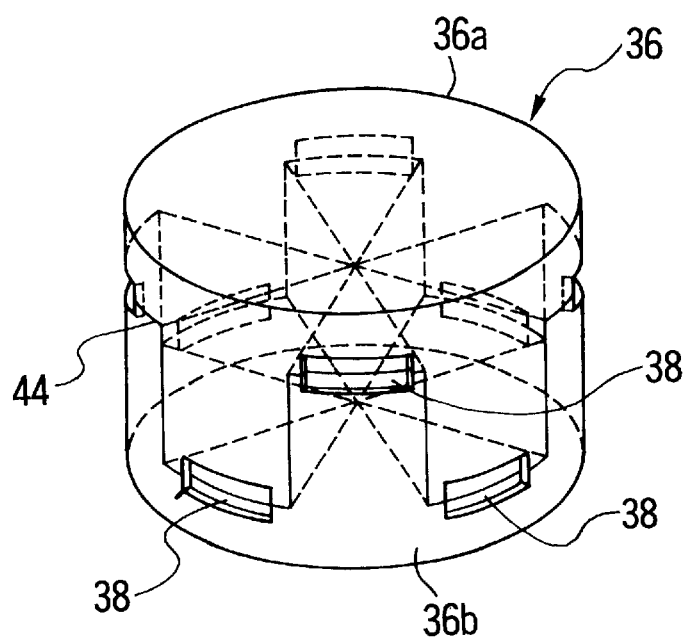
FIG. 7 is a perspective view of an inner die set for forming projections of an outer cylinder.
Figure 8:
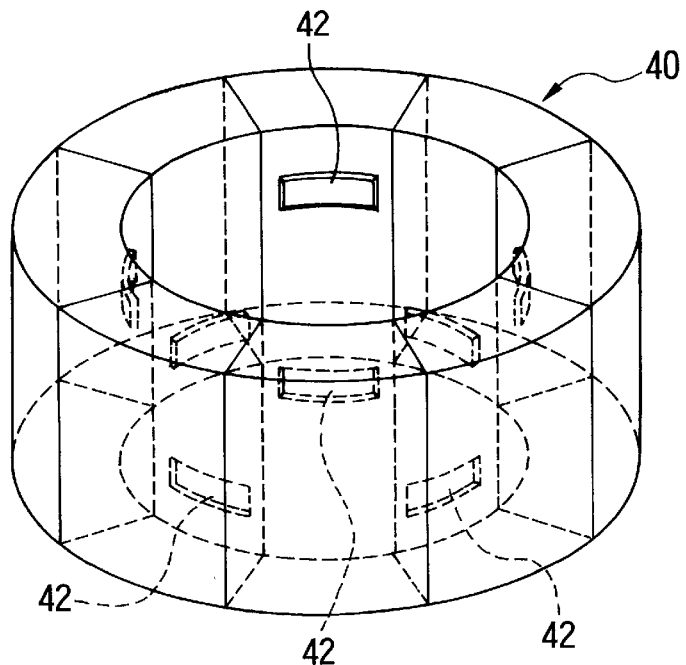
FIG. 8 is a perspective view of an outer die set for forming the projections of the outer cylinder.

In a second process, the projections 34 are press formed on the inner surface of the outer cylinder 6 by using an inner die set 36 shown in FIG. 7 and an outer die set 40 shown in FIG. 8. First, the inner die set 36 is inserted to the inner space of the outer cylinder 6. Then, the outer die set 40 is set around the outer cylinder 6, and a predetermined force is applied to the outer die set 40 to press from the projections 34.

The inner die set 36 is in the from of a column which has an outer diameter generally the same as an inner diameter of the outer cylinder 6 and has eight depressions 38 at its outer periphery as shown in FIG. 7. An outer die set 40 shown in FIG. 8 is set around the outer cylinder 6. The outer die set 40 is in the form of a cylinder and has an inner diameter generally the same as the outer diameter of the outer cylinder 6. The outer die set 40 has eight projections 42 which are located at positions corresponding to the depressions 38 of the inner die set 36. The inner die set 36 is constituted by an upper die 36a and a lower die 36b which are divided by a stepped division line 44 including lines along the circumferential direction and lines along the axial direction, as shown in FIG. 7. The depressions 38 are disposed on the outer surface of the inner die set 36 so as to be located on the division line 44 along the circumferential direction of the inner die set 36. Further, the outer die set 40 is divided into eight parts at equal intervals as shown in FIG. 8 so that the outer die set 40 is able to be disassembled in the diametrical direction. Therefore, the outer die set 40 can be set to press the outer cylinder 6 from the outside toward the center of the outer cylinder 6 after the inner die set 36 is set at the inner space of the outer cylinder 6.

Figure 9:
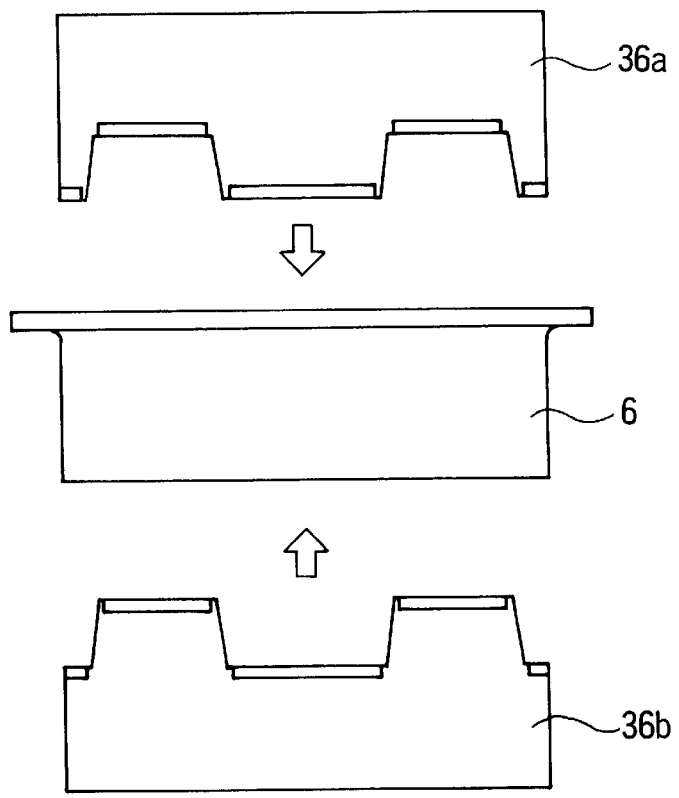
FIG. 9 is a side view showing a method for inserting the inner die set to the outer cylinder.

Accordingly, when the inner die set 36 is set in the outer cylinder 6, the upper die 36a is inserted to the inner space of the outer cylinder 6 from the upper side of the outer cylinder 6 and the lower die 36b is inserted to the inner space of the outer cylinder 6 from the lower side of the outer cylinder 6, as shown in FIG. 9. Further, the outer die set 40 is set around the outer cylinder 6 and receives a predetermined press-forming force from the outside toward the center of the outer cylinder 6 after the inner die set 36 is set at the inner space of the outer cylinder 6 to press-form the projections 34 on the inner surface of the outer cylinder 6.

Figure 10:
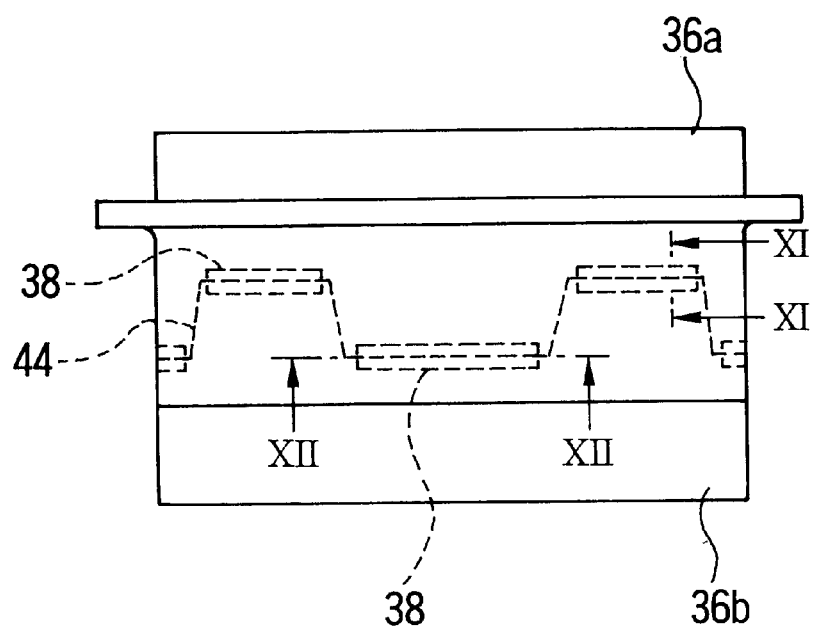
FIG. 10 is a side view showing an installed condition of the inner die set to the outer cylinder.
Figure 11:
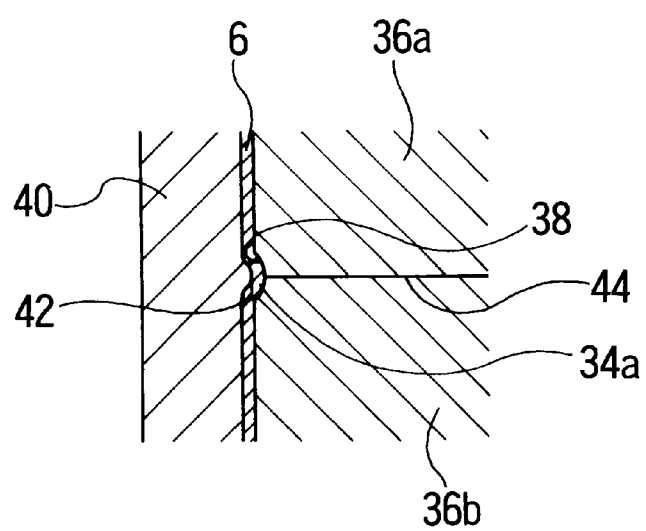
FIG. 11 is a cross-sectional view taken in the direction of arrows substantially along the line XI—XI of FIG. 10.
Figure 12:
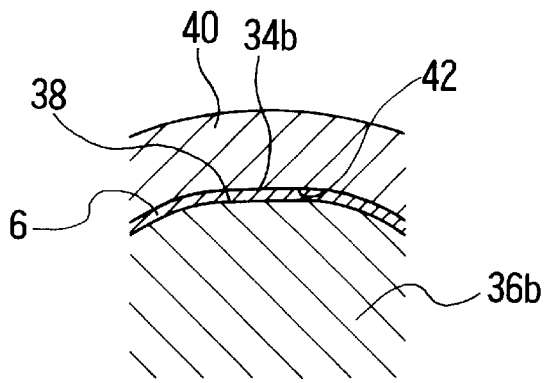
FIG. 12 is a cross-sectional view taken in the direction of arrows substantially along the line XII—XII of FIG. 10.

FIG. 10 shows a condition that the outer cylinder 6 is press-formed by the inner die set 36 and the outer die set 40. Under this condition, the projections 34 are formed at the inner surface of the outer cylinder 6 by means of the depressions 38 of the inner die set 36 and the projections 42 of the outer die set 40, as shown in FIGS. 11 and 12.

Figure 13:
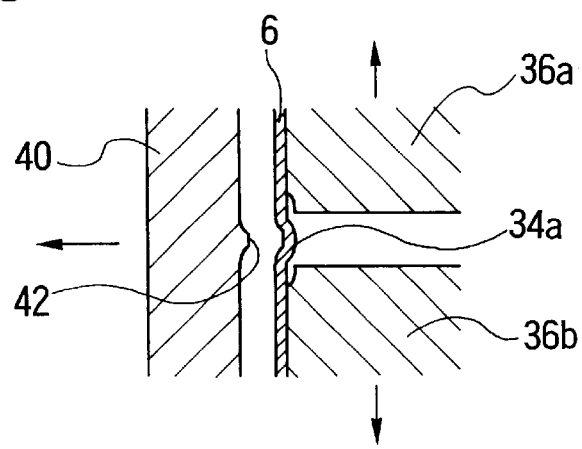
FIG. 13 is a cross-sectional view showing a die released state of FIG. 11.
Figure 14:
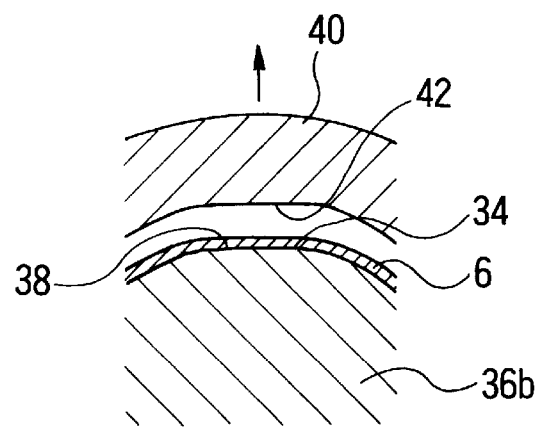
FIG. 14 is a cross-sectional view showing a die released state of FIG. 12.
Figure 15:
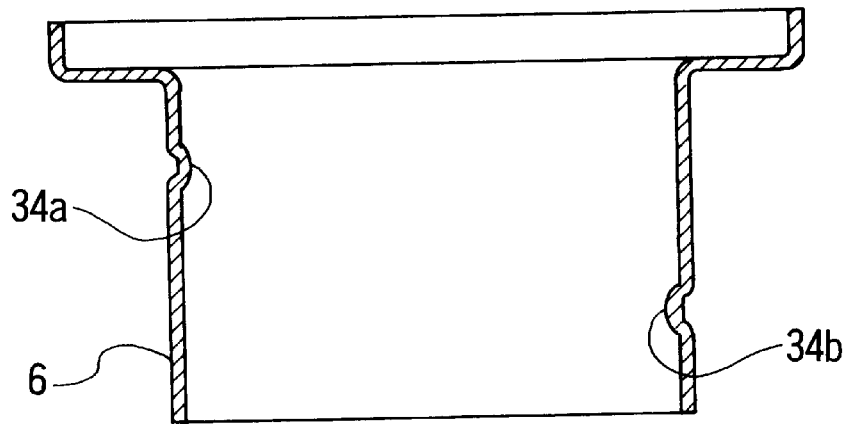
FIG. 15 is a cross-sectional view of the outer cylinder having the projections.

After the press forming of the outer cylinder 6, the upper die 36a and the lower die 36b of the inner die set 36 are drawn out from the outer cylinder 6, and the outer die set 40 is detached in the diametrically outward direction from the outer cylinder 6, as shown in FIGS. 13 and 14.

With these steps in the second process, the upper and lower projections 34a and 34b are formed on the inner surface of the outer cylinder 6 so that that the projections 34 are not overlapped with each other in the axial direction.

Figure 16:
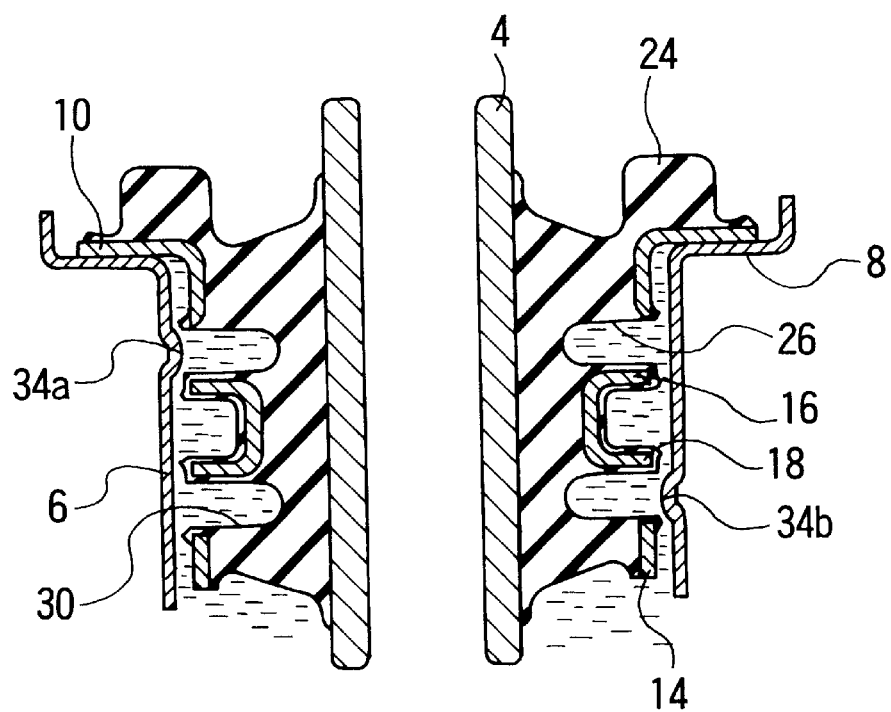
FIG. 16 is a cross-sectional view showing a setting step for inserting the elastic member to the outer cylinder in liquid.
Figure 17:
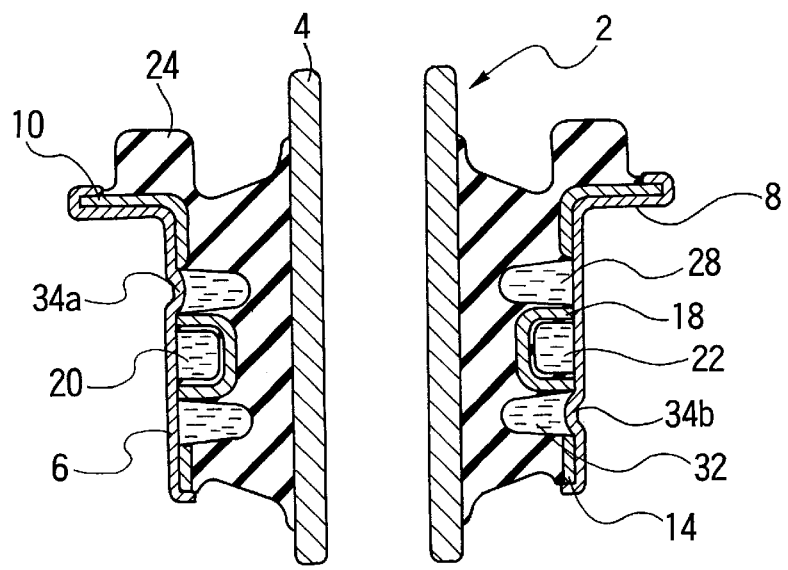
FIG. 17 is a cross-sectional view showing an assembled vibration insulator by sealingly assembling the rubber elastic member to the outer cylinder in liquid.

In a third process, the outer cylinder 6 press-formed in the second process and the elastic member 24 molded in the first process are dipped in the fluid 20, and the elastic member 24 is inserted into the outer cylinder 6, as shown in FIG. 16. Then, the elastic member 24 and the outer cylinder 6 are assembled so that the fluid 20 is sealingly filled in the first liquid chamber 28 defined by the first groove 26 and the outer cylinder 6, the second liquid chamber 32 defined by the second groove 30 and the outer cylinder 6, and the orifice passage defined by the circumferential groove 16 of the orifice ring 18 and the outer cylinder 6, as shown in FIG. 17. More specifically, the diameter of the outer cylinder 6 is decreased to fit the outer cylinder 6 with the elastic member 24. The upper projections 34a are received by the first groove 26, and the lower projections 34b are received by the second groove 30 during this assembling operation. Then, the upper periphery 12 of the first ring 10 is caulked with the outer periphery of the flange portion 8 of the outer cylinder 6, and the lower end of the second ring 14 is caulked with the lower end portion of the outer cylinder 6 to sealingly fill the liquid 20 in the vibration insulator 2.

With the thus produced liquid-sealed vibration insulator 2 according to the present invention, the inner cylinder 4, the first ring 10, the second 14 and the orifice ring 18 are integrally formed with the elastic member 24 by means of insert molding. That is, the liquid-sealed vibration insulator 2 requires only one forming die for the elastic member 24, and therefore the production cost thereof is decreased. Further, the inner cylinder 4, the first ring 10, the second ring 14, the orifice ring 18 and the elastic member 24 have been already formed integrally when they are assembled with the outer cylinder 6. This facilitates the assembly process and improves the productivity of the vibration insulator 2.

Further, the first ring 10 is correctly assembled at a predetermined position of the outer cylinder 6 due to the upper projections 34a received by the first groove 26 and the flange portion 8 of the outer cylinder 6. The second ring 14 is also correctly assembled at another predetermined position of the outer cylinder 6 due to the lower projections 34b received by the second groove 30 and the lower end of the outer cylinder 6. Further, the orifice ring 18 is correctly assembled at another predetermined position of the outer cylinder 6 due to the upper projections 34a and the lower projections 34b. Therefore, the first ring 10, second ring 14 and the orifice ring 18 are certainly and correctly positioned at the predetermined positions of the outer cylinder 6, respectively, in the axial direction while being arranged to prevent the generation of rattles (backlash) in the axial direction thereof. Consequently, the vibration insulator 2 certainly functions the aimed performance.

Figure 18:
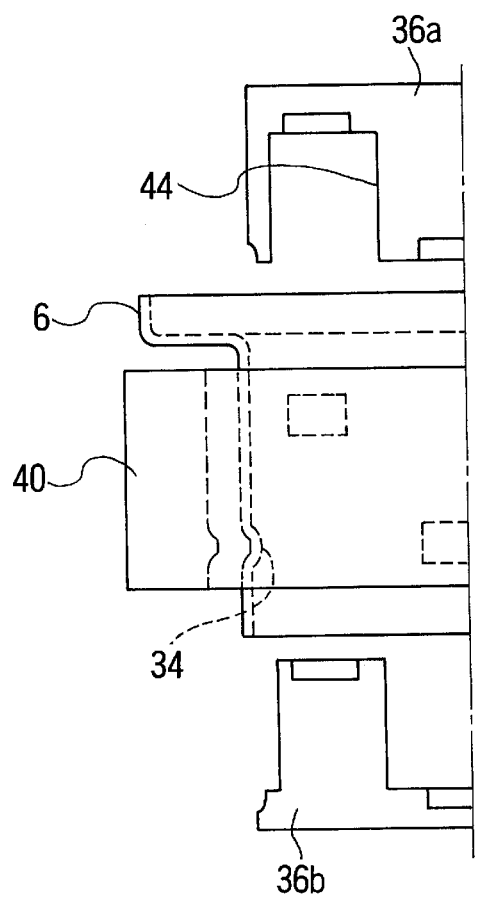
FIG. 18 is a schematic side view showing a step for releasing the inner die and the outer die from the outer cylinder.

Furthermore, the upper projections 34a and the lower projections 34b are arranged so as not to overlap therebetween in the axial direction. Therefore, by employing the inner die set 36 arranged so as to divide into the upper die 36a and the lower die 36b along the stepped division line 44 including the circumferential lines dividing the projections 38 and the axial lines, the upper and lower projections 34a and 34b are easily formed by means of press-forming, as shown in FIG. 18. More specifically, the projections 34 are provided by using the simple structure die set including the inner die set 36 set at the inner space of the outer cylinder 6 and the outer die 40 set around the outer cylinder 6. This die structure facilitates the detaching operation of the inner die 36 from the outer cylinder 6.

Although the inter die set 36 of this embodiment is arranged such that the division line 44 between the upper die 36a and the lower die 36b crosses on the projections 38, it will be understood that the division line 44 may be provided to correspond with the periphery of the projections 38.

Figure 19:
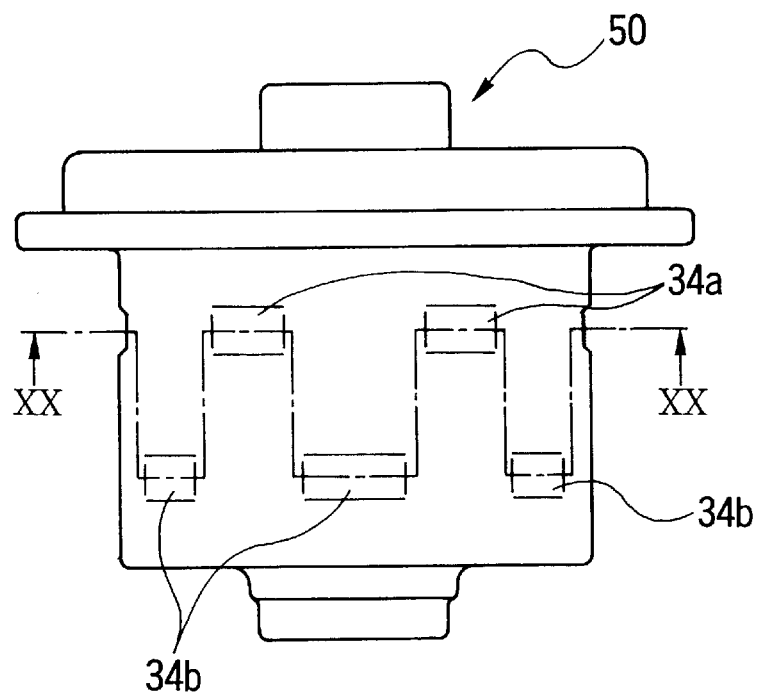
FIG. 19 is a side view showing the liquid-sealed vibration insulator of a second embodiment according to the present invention.
Figure 20:
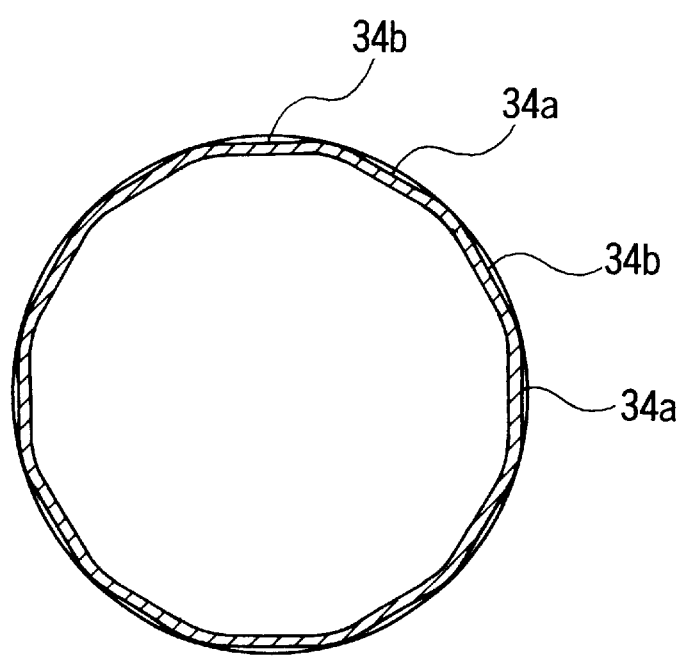
FIG. 20 is a cross-sectional view taken in the direction of arrows substantially along the line XX—XX of FIG. 19.

Referring to FIGS. 19 and 20, there is shown a liquid-sealed vibration insulator 50 of a second embodiment according to the present invention. In this second embodiment, like reference numerals denote like parts and elements of the first embodiment, and the explanation thereof is omitted herein.

The liquid-sealed vibration insulator 50 of the second embodiment is arranged such that the outer cylinder 6 has six upper projections 34a received by the first groove 26 and six lower projections 34b received by the second groove 30, as shown in FIGS. 19 and 20. The six upper projections 34a formed on the inner surface of the outer cylinder 6 are arranged at predetermined intervals to face with the first groove 26. The six lower projections 34b formed on the inner surface of the outer cylinder 6 are arranged at predetermined intervals to face with the second groove 30. The production method of the liquid-sealed vibration insulator 50 is basically the same as that of the first embodiment although the die set for the outer cylinder 6 is modified according to the number of the projections 34 formed on the inner surface of the outer cylinder 6.

With the thus arranged vibration insulator 50 according to the present invention, the number of the projections 34 of the second embodiment is greater than that of the first embodiment. Therefore, the first ring 10, the second ring 14 and the orifice ring 18 are further stably supported by the projections 34 formed on the inner surface of the outer cylinder 6 so as to prevent rattles (backlash) in the axial direction. In designing the outer cylinder, it is important to consider the balance between the number of the projections 34 and the projection amount of each projection 34 since the increase of the number of the projections 34 requires the decrease of the projection amount of each projection 34.

Figure 21:
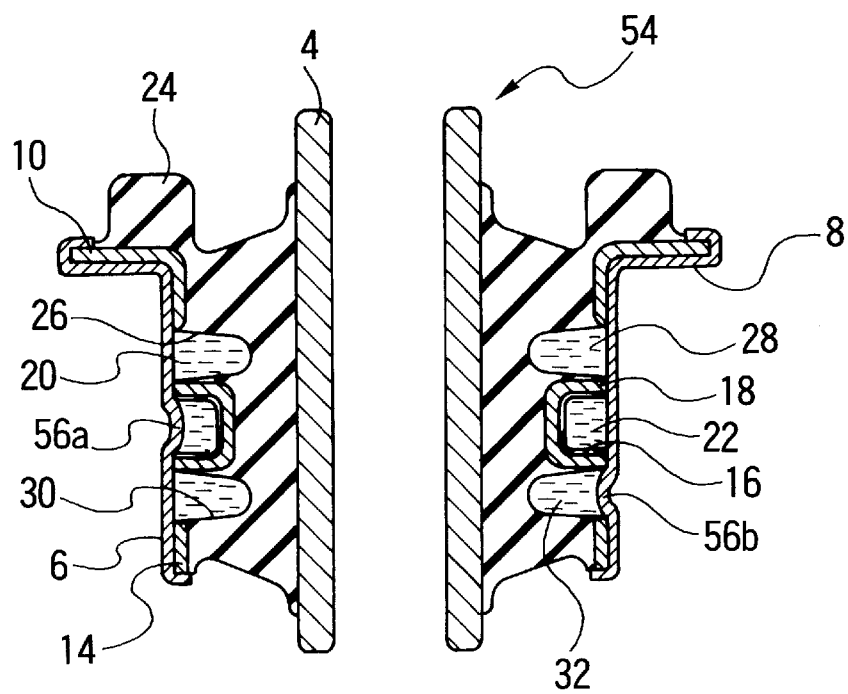
FIG. 21 is a cross-sectional view showing the liquid-sealed vibration insulator of a third embodiment according to the present invention.
Figure 22:
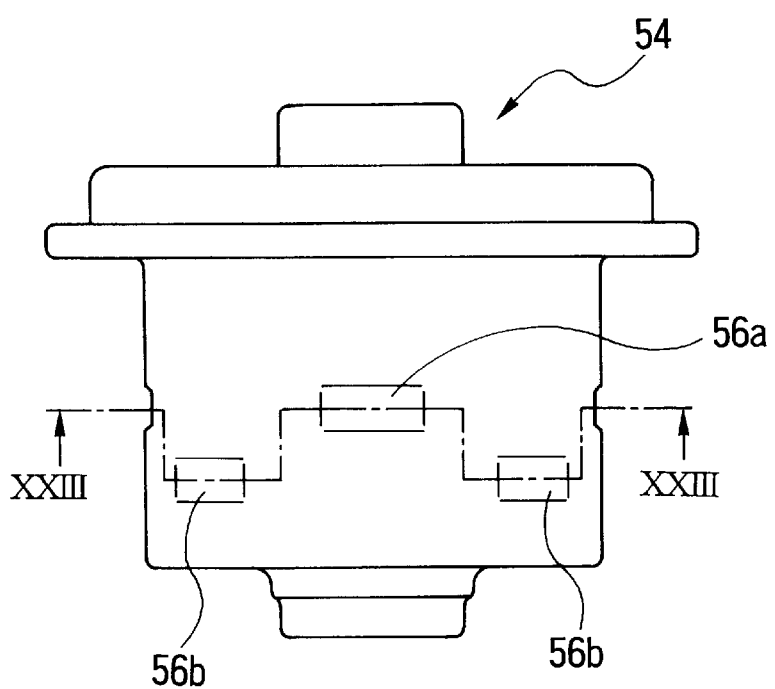
FIG. 22 is a side view showing the liquid-sealed vibration insulator of the third embodiment.
Figure 23:
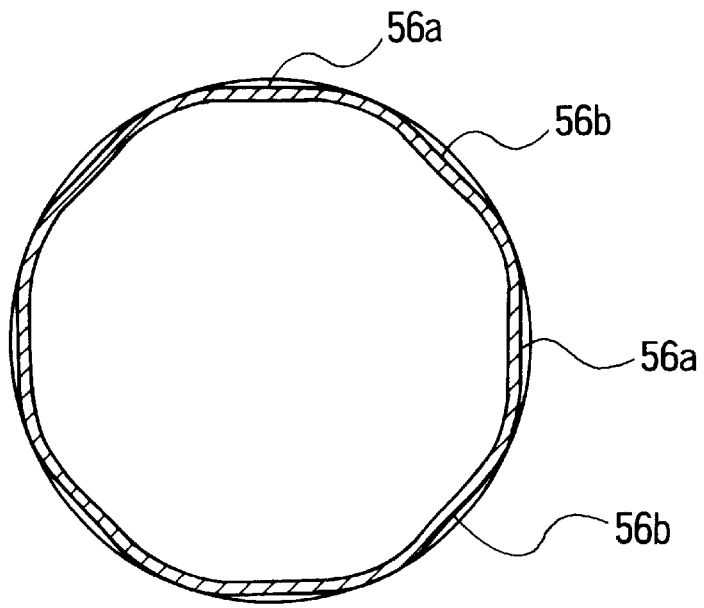
FIG. 23 is a cross-sectional view taken in the direction of arrows substantially along the line XXIII—XXIII of FIG. 22.

Referring to FIGS. 21 to 23, there is shown a liquid-sealed vibration insulator 54 of a third embodiment according to the present invention. In this third embodiment, like reference numerals denote like parts and elements of the first embodiment, and the explanation thereof is omitted herein.

The liquid-sealed vibration insulator 54 of the third embodiment is arranged such that four intermediate projections 56a and four lower projections 56b are formed on the inner surface of the outer cylinder 6 at predetermined intervals, as shown in FIGS. 22 and 23. The four intermediate projections 56a are received by the circumferential groove 16 of the orifice ring 18, and the four lower projections 56b are received by the second groove 30. The projections 56a are in contact with the opening periphery of the orifice ring 18. The projections 56b are in contact with the orifice ring 18 and the second ring 14.

The liquid 20 is disposed between the members to damp transmitting vibrations between the members. To fill the liquid 20 between the members is executed by press-fitting the outer cylinder 6 to the elastic member(24 in liquid 20. When this press-fitting is executed, if the outer cylinder 6 has the flange portion 8, a press-fitting portion is mostly a predetermined length portion of the outer cylinder continuous with the flange portion 8 along the axial direction. Therefore, if the projections 56 are provided at the inner surface of the outer cylinder 6, the maintaining force of the press-fitting at the inner surface of the outer cylinder 6 tends to decrease due to the provision of such projections, or the press-fitting force of the outer cylinder tends to be increased due to the micro deformation at the outer surface of the outer cylinder 6 around the depression corresponding to the projections 56.

That is, with the thus arranged vibration insulator 54 according to the present invention, since the projections 56 are not formed in the vicinity of the flange portion 8, the assembly operation of the outer cylinder 6 to the elastic member 24 is relatively facilitated, and the degradation of the connecting force between the outer cylinder 6 and the rubber elastic member 24 is prevented.

Figure 24:
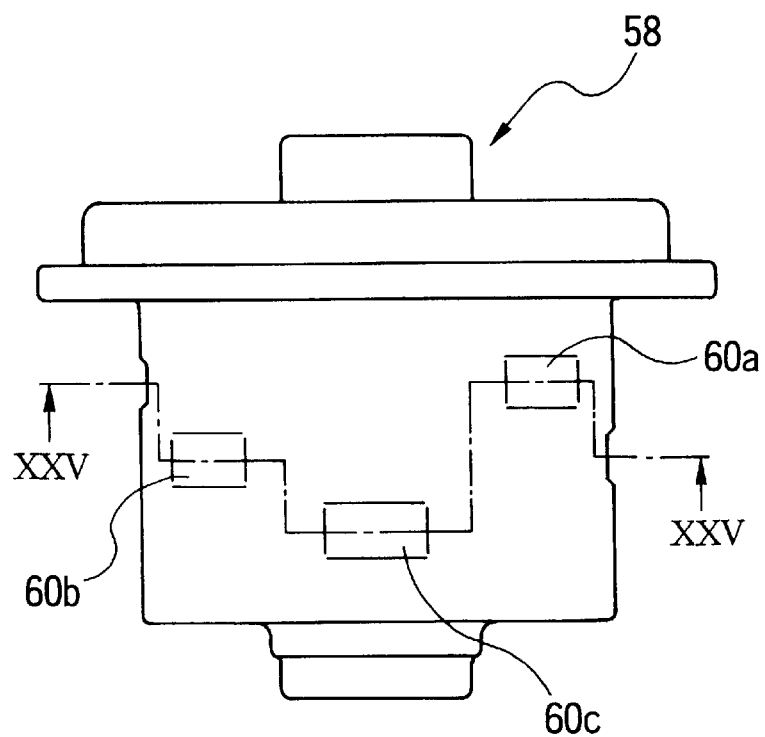
FIG. 24 is a side view showing the liquid-sealed vibration insulator of a fourth embodiment according to the present invention.
Figure 25:
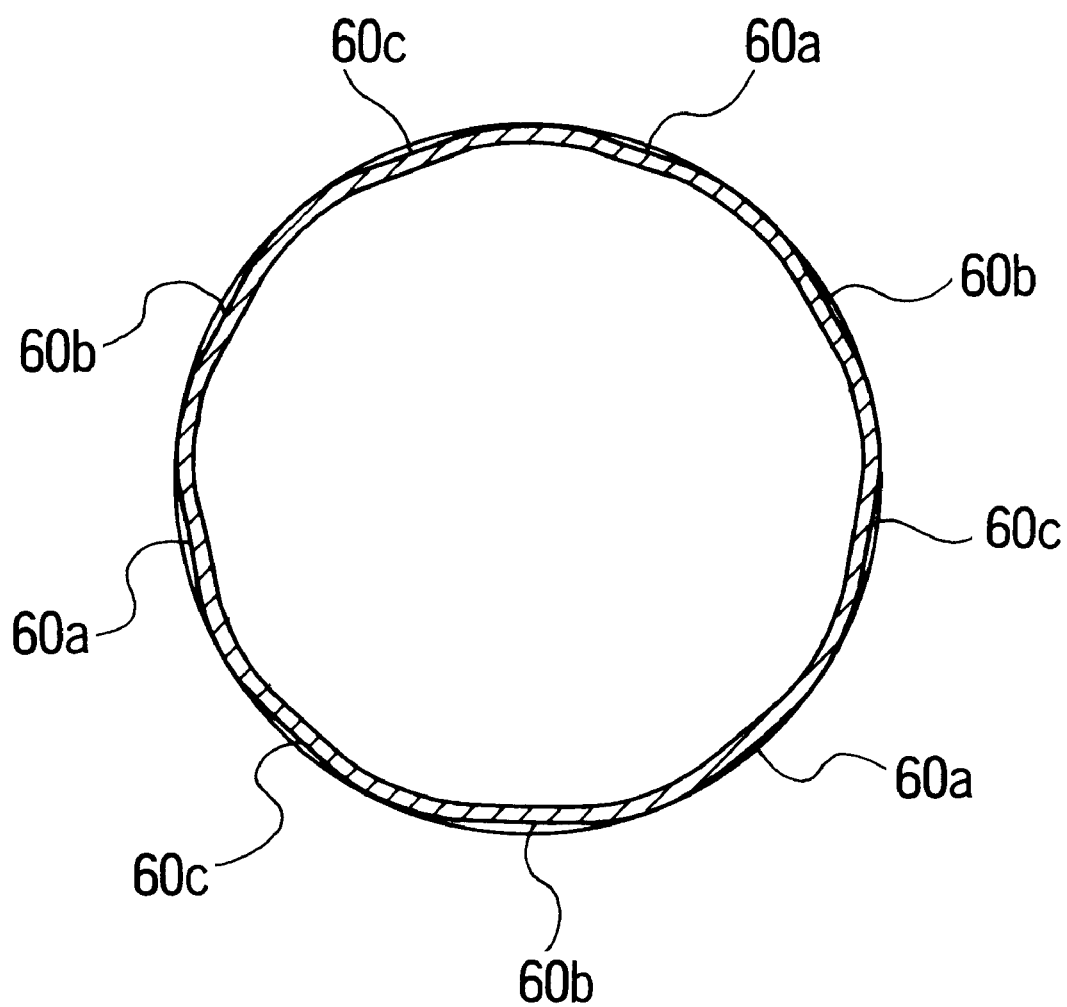
FIG. 25 is a cross-sectional view taken in the direction of arrows substantially along the line XXV—XXV of FIG. 19.

Referring to FIGS. 24 and 25, there is shown a liquid-sealed vibration insulator 58 of a fourth embodiment according to the present invention. In this fourth embodiment, like reference numerals denote like parts and elements of the first embodiment, and the explanation thereof is omitted herein.

The vibration insulator 58 is arranged to provide three upper projections 60a, three intermediate projections 60b and three lower projections 60c so as to be received by the first groove 26, the circumferential groove 16 of the orifice ring 18 and the second groove 30, respectively, as shown in FIGS. 24 and 25.

With the thus arranged vibration insulator 58 of the fourth embodiment, since the projections 60 are disposed at axially upper, intermediate and lower portions of the outer cylinder 6, the first ring 10, the second ring 14 and the orifice ring 18 are assembled at predetermined positions while keeping the positional balance thereamong. Therefore, the vibration insulator 58 according to the present invention is arranged to effectively prevent the backlash in the axial direction thereof.

Further, the outer diameter of the outer cylinder 6 may be varied in the axial direction. For example, if the outer cylinder 6 is formed to have a taper in the axial direction so that a diameter at a side of the flange portion 8 of the outer cylinder 6 is slightly greater than that of the other side of the outer cylinder 6, easiness of the assembly of the vibration insulator is further improved thereby.

The entire disclosure of Japanese Patent Applications No. 10-357071 filed on Dec. 16, 1998 including specification, claims, drawings and summary are incorporated herein by reference in its entirety.

What is claimed is:

1. A liquid-sealed vibration insulator comprising:
   an inner cylinder;
   a first ring having a L-shaped cross section;
   a second ring;
   an orifice ring of one-piece structure having a U-shaped cross section, said orifice ring being located between said first and second rings;
   an elastic member of a cylindrical shape molded integrally with said inner cylinder, said first ring, said second ring, and said orifice ring, said elastic member having a cylinder inner surface to which said inner cylinder is integrally connected, and a cylinder outer surface to which said first ring, said orifice ring and said second ring are integrally connected, said elastic member having a first groove formed on the cylinder outer surface between said first ring and said orifice ring and a second groove formed on the cylinder outer surface between said orifice ring and said second ring; and
   an outer cylinder integrally connected to said first ring and said second ring by decreasing a diameter of said outer cylinder in liquid, said outer cylinder and the first groove defining a first liquid chamber, said outer cylinder and the second groove defining a second liquid chamber, said outer cylinder and said orifice ring defining an defining an orifice passage fluidly communicating the first and second liquid chambers, the first and second liquid chambers and the orifice passage being filled with the liquid;
   wherein said outer cylinder has a plurality of projections on an inner surface of said outer cylinder, the projections being formed by setting an inner die set to an inner space of the outer cylinder, setting an outer die set around the outer cylinder, and applying a predetermined force to the outer die set to press form projections, and wherein the inner set die is constituted by an upper die and a lower die which are divided by a stepped division line including lines along the circumferential direction and lines along the axial direction of the outer cylinder, depressions being disposed on the outer surface of the inner die set so as to be located on the division line along the circumferential direction of the inner die set, the outer die set being divided into the plural parts so that the outer die set is able to be disassembled in the diametrical direction.

2. A liquid-sealed vibration insulator as claimed in claim 1, wherein a plurality of said projections are disposed circumferentially on the outer cylinder inner surface to be received by one of the first groove, the second groove and said orifice ring.

3. A liquid-sealed vibration insulator as claimed in claim 1, wherein said projections are arranged so as not to be overlapped with each other with respect to an axial direction on the outer cylinder inner surface.

4. A liquid-sealed vibration insulator as claimed in claim 1, wherein said first ring is fixedly engaged with a flanged end portion of said outer cylinder by means of caulking, and an end portion of said second ring is fixedly engaged with the other end portion of said outer cylinder by means of caulking.

5. A liquid-sealed vibration insulator as claimed in claim 1, wherein said orifice ring is made from a metal sheet by blanking a pair of annular members respectively having center holes from the metal sheet, drawing an inner periphery of each blanked annular member into a L-shaped cross section, and welding the edges of the drawn end of the pair of members by means of butt welding.

6. A liquid-sealed vibration insulator as claimed in claim 1, wherein the projections have the form of a rectangular, the projections including four upper projections received by the first groove at predetermined intervals, and four lower projections received by the second groove at predetermined intervals.

7. A liquid-sealed vibration insulator as claimed in claim 1, wherein the projections include six upper projections received by the first groove and six lower projections received by the second groove.

8. A liquid-sealed vibration insulator as claimed in claim 1, wherein the projections includes four intermediate projection received by a circumferential groove of said orifice ring and four lower projections received by the second groove.

9. A liquid-sealed vibration insulator as claimed in claim 1, wherein the projections includes three upper projections received by the first groove, three intermediate projections received by circumferential groove of said orifice ring, and three lower projections received by the second groove.

10. A liquid-sealed vibration insulator as claimed in claim 1, wherein said orifice ring has a pair of cutout portions through which the first liquid chamber and the second liquid chamber are connected to the orifice passage.

11. A method for producing a liquid-sealed vibration insulator comprising the steps of:

molding an elastic member of a cylinder shape, the elastic member having a cylinder inner surface integrally connected to an inner cylinder and a cylinder outer surface integrally connected to a first ring, an orifice ring and a second ring, the elastic member having a first groove formed on the cylinder outer surface between the first ring and the orifice ring and a second groove formed on the cylinder outer surface between the orifice ring and the second ring;

forming a plurality of projections on an inner surface of an outer cylinder by setting an inner die set to an inner space of the outer cylinder, by setting an outer die set around the outer cylinder, and by applying a predetermined force to the outer die set to press form projections; and assembling the elastic member and the outer cylinder in liquid;

wherein the inner die set is constituted by an upper die and a lower die which are divided by a stepped division line including lines along the circumferential direction and lines along the axial direction of the outer cylinder, depressions being disposed on the outer surface of the inner die set so as to be located on the division line along the circumferential direction of the inner die set, the outer die set being divided into the plural parts at equal intervals so that the outer die set is able to be disassembled in the diametrical direction.

12. A method as claimed in claim 11, wherein said elastic member molding step includes setting the inner cylinder, the first ring, the second ring and the orifice ring in a molding die and supplying elastic material into the molding die to integrally form the elastic member with the inner cylinder, the first ring, the second ring and the orifice ring.

13. A method as claimed in claim 11, wherein said assembling step includes dipping the outer cylinder having the projections and the elastic member integral with the inner cylinder, the first ring, the second ring and the orifice ring in the liquid, inserting the elastic member into the outer cylinder, and sealingly connecting the outer cylinder with the first ring and the second ring.

14. A method as claimed in claim 11, wherein said projection forming step includes setting an inner die set to an inner space of the outer cylinder, setting an outer die set around the outer cylinder, and applying a predetermined force to the outer die set to press from the projections.

15. A method as claimed in claim 14, wherein the inner die set is in the from of a column which has an outer diameter generally the same as an inner diameter of the outer cylinder and has a plurality of depressions at its outer periphery, and the outer die set is in the form of a cylinder and has an inner diameter generally the same as the outer diameter of the outer cylinder, the outer die set has a plurality of projections which are located at positions corresponding to the depressions of the inner die set.

* * * * *